Nov. 6, 1928.
E. B. STALEY
1,690,558
TRAILER HITCH
Filed Jan. 18, 1927
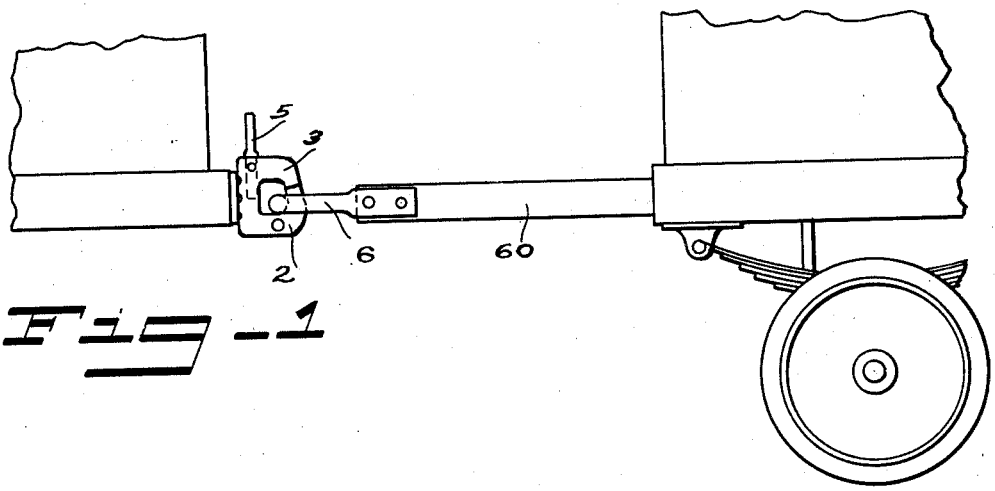
Fig-1
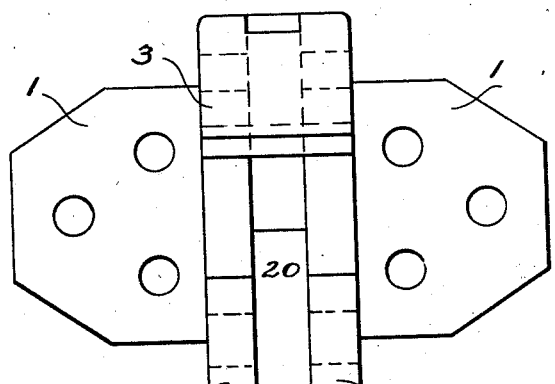
Fig-3
Fig-2
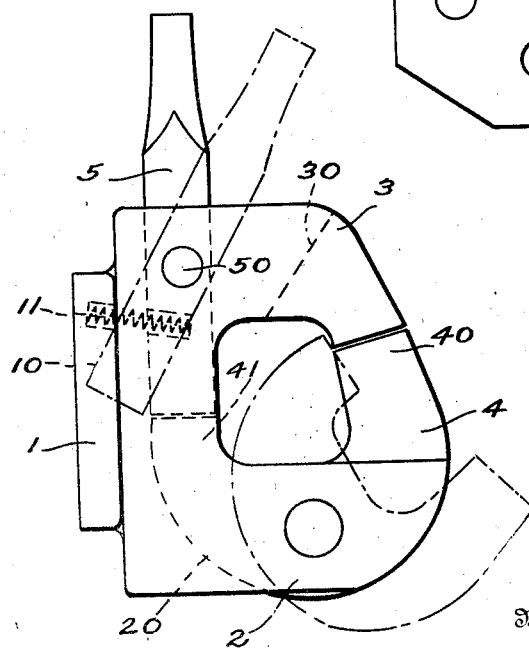
Inventor
Earl B. Staley
By H.L. & C.L. Reynolds.
Attorneys Patented Nov. 6, 1928.

1,690,558

UNITED STATES PATENT OFFICE.

EARL B. STALEY, OF SEATTLE, WASHINGTON.

TRAILER HITCH.

Application filed January 18, 1927. Serial No. 161,763.

My invention relates to a coupling device or hitch, adapted for use in coupling together vehicles. It has been specifically designed for the coupling of tractors and trailers, although it is evident that it may be used for coupling purposes between any two types of vehicles.

The object of my invention is to provide a simple, strong and cheaply made device which may be mounted upon trucks or tractors, so that trailers may be quickly and securely coupled thereto, preferably without having to manually operate the coupling at the time of making connection.

My invention consists of the particular constructions hereinafter described, and particularly defined by the claims. The accompanying drawings show my invention embodied in the type of construction which is now preferred by me.

Figure 1 illustrates my coupling mounted upon one end of a tractor vehicle and the manner in which the trailer is connected therewith;

Figure 2 is a rear face view of the main casing or frame which is secured to the rear end of the truck or tractor.

Figure 3 is a side view of the assembled device.

This coupling member employs a frame or casing which is provided with ears or flanges 1, or other equivalent means, by which it may be secured to the rear end of the truck or tractor. As contemplated, these ears 1 are provided with holes for the reception of bolts by which it may be bolted to the rear transverse bar of a truck or tractor. This casing also has two parallel ears or arms 2 extending forwardly from the lower portion thereof, and an upper arm 3 also extending forwardly and over the said arms 2. The arms 2 are separated sufficiently to receive between them the holding bar or finger 4. This is made to resemble a low or squat U, of which one bar forms an upstanding pin engaging with a link or other device carried by the trailer, so as to transmit the tractive strain from the tractor to the trailer. The main frame is provided with a slot which is a rearward extension of the space between the two arms 2, which recess is indicated by the dotted lines 20 in Figure 3. This is of such size as to receive the other finger of the holding member 4.

This recess 20 is also extended upwardly to form a channel or slot, of which the upper forward edge is indicated by the dotted line 30. In this slot is mounted a trigger bar 5 pivoted at 50 and having its lower end of such length that when the trigger bar 5 is in vertical position, its lower end will abut against the upper end face of the inner arm 41 of the holding bar or finger 4. In this position it is evident that a forward pulling strain upon the outer arm 40 will be resisted, and the forward swinging of the holding member 4 will be prevented.

To permit swinging of the holding bar or finger 4 so as to permit insertion of the draft link of the trailer or to permit its removal, the rear portion of the frame is recessed as at 10, so as to receive the lower end of the trigger bar 5 when swung into the position indicated by dotted lines in Figure 3. In this position the holding finger 4 may be swung into the position indicated by the broken lines, which will permit ingress or egress of the draft link.

In connection with the above member which is secured to the front end of the tractor or truck, the trailer is provided with a link or loop 6 which may be supported upon the end of a short tongue as 60, or in any other way found suitable, secured to the trailer. It is intended that this be secured to the trailer in such a manner that it is at the same elevation as the gap between the arms 2 and 3 of the main frame of the hitching device. When, therefore, the tractor is backed against this hitching device, when the holding finger has been placed in its releasing position, it will enter the opening between the fingers 2 and 3, engage the rear arm 41 of the holding finger and swing it back. In doing so it causes the lower end of the trigger bar 5 to swing backwardly until the end of the arm 41 is below the end of the trigger finger, whereupon the latter will have its lower end swung forward and the device is locked. To insure this forward swinging of the trigger bar, I have shown a spring, as 11, which is mounted between the casing and the trigger finger so as to insure its normally being swung to the locking position. The trigger finger 5 extends upward above the frame or casing a sufficient distance to form a convenient handle by which it may be operated. The device may be released by the operator of the tractor without other help, by swinging it into its forward or released position and then dropping a wedge between the trigger finger just above its pivot point and the back face of the slot in which the trigger finger is mounted.

What I claim as my invention is:

1. A coupling device for vehicles, comprising a shrouding frame having two separated lower jaws and an upper jaw spaced above and opposite the ends of said lower jaws, a U-shaped holding finger pivoted by its central portion between said lower jaws and adapted when in holding position to close the opening between lower and upper jaws, and a vertically positioned locking bar pivoted in the upper part of the shrouding frame, with its upper end projecting to form an operating handle, and movable into position to engage and to free the upper face of the inner end of the holding finger.

2. A coupling device for vehicles, comprising a base frame having upper and lower projection jaws, an angularly bent holding finger centrally pivoted upon the lower jaw with one end adapted in one position to close the gap between upper and lower jaws, a locking bar centrally pivoted in the upper part of the base frame in position to normally engage its lower end face with the upper face of the inner end of the holding finger and swingable rearwardly to clear the said inner end.

3. A coupling device for vehicles, comprising a base frame having upper and bifurcated lower projecting jaws, a U-shaped holding finger pivoted by its central portion between the lower jaw members and adapted in one position to close by its outer arm the gap between upper and lower jaws, a locking bar centrally pivoted in the upper part of the base frame in position to normally engage its lower end face with the upper face of the inner arm of the holding finger and movable to swing its lower end rearwardly to clear the said arm, the upper end of said locking bar extending above the frame to form an operating handle.

4. A coupling device for vehicles, comprising a shrouding frame having two separated lower jaws and an upper jaw spaced above and opposite the ends of said lower jaws, a U-shaped holding finger pivoted by its central portion between said lower jaws and adapted when in holding position to close the opening between lower and upper jaws, a locking bar pivoted in the upper part of the shrouding frame and movable into position to engage its end face with the upper face of the inner end of said holding finger, and movable to swing its lower end rearwardly to thereby free the inner end of the holding finger, and a spring acting upon the locking bar to normally hold it in locking position.

Signed at Seattle, King County, Washington, this 12th day of January, 1927.

EARL B. STALEY.